US011244036B2

(12) United States Patent
Okada et al.

(10) Patent No.: US 11,244,036 B2
(45) Date of Patent: Feb. 8, 2022

(54) AUTHENTICATION SYSTEM AND AUTHENTICATION DEVICE

(71) Applicants: TOYOTA JIDOSHA KABUSHIKI KAISHA, Toyota (JP); NEC CORPORATION, Tokyo (JP)

(72) Inventors: Hiroki Okada, Toyota (JP); Ryuta Atsumi, Toyota (JP); Satoshi Fujisaki, Nagoya (JP); Daisuke Hiroki, Toda (JP); Shinpei Asai, Okazaki (JP); Kouji Oosugi, Tokyo (JP)

(73) Assignees: TOYOTA JIDOSHA KABUSHIKI KAISHA, Toyota (JP); NEC CORPORATION, Tokyo (JP)

( * ) Notice: Subject to any disclaimer, the term of this patent is extended or adjusted under 35 U.S.C. 154(b) by 318 days.

(21) Appl. No.: 16/215,054

(22) Filed: Dec. 10, 2018

(65) Prior Publication Data

US 2019/0197221 A1 Jun. 27, 2019

(30) Foreign Application Priority Data

Dec. 21, 2017 (JP) .............................. JP2017-245370

(51) Int. Cl.
*G06F 21/32* (2013.01)
*G06F 21/34* (2013.01)
(Continued)

(52) U.S. Cl.
CPC .............. *G06F 21/32* (2013.01); *G06F 21/34* (2013.01); *H04L 9/3231* (2013.01);
(Continued)

(58) Field of Classification Search
CPC .......... G06F 21/32; G06F 21/34; G06F 21/45; H04L 9/3231; H04L 63/0861; H04L 63/0853; H04R 1/1016
See application file for complete search history.

(56) References Cited

U.S. PATENT DOCUMENTS

2010/0241857 A1  9/2010 Okude et al.
2011/0314530 A1  12/2011 Donaldson
(Continued)

FOREIGN PATENT DOCUMENTS

EP      1501002 A2    1/2005
JP   2003-146107 A    5/2003
(Continued)

OTHER PUBLICATIONS

English translation of JP-2018-010470-A (Year: 2018).*
(Continued)

*Primary Examiner* — Daniel B Potratz
*Assistant Examiner* — Wansik You
(74) *Attorney, Agent, or Firm* — Oliff PLC

(57) ABSTRACT

An authentication system that executes user authentication processing in accordance with an authentication request includes at least one first device. The first device has a biological information acquiring unit that is configured to acquire biological information of a user, and a first authentication unit that outputs an authentication result of which the user is authenticated, based on the biological information. The authentication system includes a second device that is configured to communicate with the first device. The second device has an information acquiring-storing unit that is able to store identification information of the first device beforehand, a determination unit that is configured to determine whether the first device is registered, and a second authentication unit that is configured to perform user authentication, in accordance with an authentication result output by the first authentication unit, when the determination unit determines that the first device is registered.

9 Claims, 6 Drawing Sheets

(51) Int. Cl.
  *H04L 9/32* (2006.01)
  *H04L 29/06* (2006.01)
  *H04R 1/10* (2006.01)

(52) U.S. Cl.
  CPC ...... *H04L 63/0861* (2013.01); *H04L 63/0853* (2013.01); *H04R 1/1016* (2013.01)

(56) References Cited

U.S. PATENT DOCUMENTS

| | | | |
|---|---|---|---|
| 2015/0161371 A1 | 6/2015 | Hoshi et al. | |
| 2017/0008490 A1* | 1/2017 | Sako | B60R 25/25 |
| 2017/0193314 A1* | 7/2017 | Kim | G06F 21/32 |
| 2017/0200046 A1* | 7/2017 | Bang | G06F 21/31 |
| 2017/0249791 A1* | 8/2017 | Woo | G07C 9/00309 |
| 2018/0227829 A1* | 8/2018 | Mochizuki | H04M 1/605 |
| 2019/0289463 A1* | 9/2019 | Glouche | H04W 12/069 |

FOREIGN PATENT DOCUMENTS

| | | | |
|---|---|---|---|
| JP | 2005-050103 A | | 2/2005 |
| JP | 2009-123059 A | | 6/2009 |
| JP | 2010-086328 A | | 4/2010 |
| JP | 2010086328 A | * | 4/2010 |
| JP | 2013-063672 A | | 4/2013 |
| JP | 2015-153258 A | | 8/2015 |
| JP | 2015-197906 A | | 11/2015 |
| JP | 2018010470 A | * | 1/2018 |
| WO | 2014/147713 A1 | | 9/2014 |
| WO | 2017/142256 A1 | | 8/2017 |

OTHER PUBLICATIONS

English translation of JP-2010-086328-A (Year: 2010).*
Humphries, Matthew. "NEC Uses Sound Echoes in Your Ear as Biometric Authentication", 2016, https://www.geek.com/chips/nec-uses-sound-echoes-in-your-ear-as-biometric-authentication-1649229/.

* cited by examiner

AUTHENTICATION SYSTEM AND AUTHENTICATION DEVICE

INCORPORATION BY REFERENCE

The disclosure of Japanese Patent Application No. 2017-245370 filed on Dec. 21, 2017 including the specification, drawings and abstract is incorporated herein by reference in its entirety.

BACKGROUND

1. Technical Field

The disclosure relates to an authentication system and an authentication device that authenticate a user.

2. Description of Related Art

It is proposed to acquire a user's biological information and perform user authentication based on the biological information. Japanese Patent Application Publication No. 2003-146107 (JP 2003-146107 A) discloses an authentication device that permits a user to perform access to a vehicle such as starting an engine and locking/unlocking a door through fingerprint authentication. Japanese Patent Application Publication No. 2010-86328 (JP 2010-86328 A) discloses a terminal device that is attached to a user's ear, emits a reference sound to an auditory canal from a sound emission unit, collects a reflected sound with a sound collection unit, and authenticates the user based on characteristics of the reflected sound. Japanese Patent Application Publication No. 2015-197906 (JP 2015-197906 A) discloses a concept which improves security by combining authentication using a card and authentication using biological information for authentication at a door when entering a room, and which improves convenience by omitting authentication using biological information for users whose authentication using biological information within a certain period have resulted in success, when authentication using the card is successful.

SUMMARY

In an authentication system that includes a biological authentication device that performs user authentication using biological information, and a device that acquires a user authentication result from the biological authentication device and that controls a permission to access a vehicle etc. based on the authentication result, the user authentication results from a plurality of the biological authentication devices are able to be received. Thus, convenience can be improved for a plurality of the users. Although the possibility is very low, there is a risk of the operation of the vehicle etc. being permitted when the user authentication result from the biological authentication is incorrect. Thus, there is room for improving security.

The disclosure further improves security of an authentication system that performs authentication with biological information.

A first aspect of the disclosure is an authentication system that executes user authentication processing in accordance with an authentication request. The authentication system includes at least one first device that acquires biological information of a user. The first device has a biological information acquiring unit that is configured to acquire the biological information of the user, and a first authentication unit that outputs an authentication result of which the user was authenticated as an authentication for the user to use the first device, based on the biological information. The authentication system includes a second device that is configured to communicate with the first device. The second device has an information acquiring-storing unit that is able to store identification information of the first device beforehand, a determination unit that is configured to determine whether the first device is registered based on identification information received from the first device and the identification information in the information acquiring-storing unit, and a second authentication unit that is configured to perform user authentication, as an authentication for the user to use the second device, in accordance with the authentication result output by the first authentication unit that is received from the first device, when the determination unit determines that the first device is registered.

Thus, in authentication using the biological information, it is possible to improve security, since the second device authenticates the user in accordance with the user authentication result by the first device, when the first device that acquires the biological information is registered in the second device.

A second aspect of the disclosure is an authentication system that executes user authentication processing in accordance with an authentication request. The authentication system includes at least one first device that acquires biological information of a user. The first device has a biological information acquiring unit that is configured to acquire the biological information of the user. The authentication system includes a second device that is configured to communicate with the first device. The second device has a first authentication unit that is configured to output an authentication result of authenticating the user as an authentication for the user to use the first device, based on the biological information acquired by the first device, an information acquiring-storing unit that is able to store identification information of the first device beforehand, a determination unit that is configured to determine whether the first device is registered, based on identification information received from the first device and the identification information in the information acquiring-storing unit, and a second authentication unit that is configured to perform user authentication, as an authentication for the user to use the second device, in accordance with the authentication result output by the first authentication unit, when the determination unit determines that the first device is registered.

Thus, in authentication using the biological information, it is possible to improve security, since the second device authenticates the user in accordance with the user authentication result by the first device, when the first device that acquires the biological information is registered in the second device.

The second authentication unit may be configured to further execute an additional authentication when the determination unit determines that the first device is not registered and authenticate the user in accordance with an authentication result of the additional authentication.

Thus, even if the first device is not registered in the second device, the second device is able to authenticate the user and is able to improve convenience while ensuring security.

The information acquiring-storing unit may be configured to further store the biological information of the user beforehand or acquire the biological information of the user from an external device other than the first device. The second authentication unit may be configured to compare the biological information received from the first device and the biological information in the information acquiring-storing unit and determine whether the authentication result by the first authentication unit is correct, when executing the additional authentication.

Thus, it is possible to perform reliability confirmation of the first device and user authentication.

The information acquiring-storing unit may be configured to store information beforehand or acquire information from an external device other than the first device, the information indicating a combination of a question and an answer of the user to the question. The second authentication unit may be configured to transmit the question in the information acquiring-storing unit to the first device, make the first device present the question to the user and receive an answer from the user, and compare the answer received from the first device and the answer in the information acquiring-storing unit, when executing the additional authentication.

Thus, it is possible to improve accuracy of user identification by using information other than the biological information.

The second authentication unit may be configured to set prescribed authority to the user based on an authentication result by the second authentication unit. Authority that is set when the second authentication unit authenticates the user in accordance with the result of the additional authentication may be more limited than authority set when the second authentication unit authenticates the user in accordance with the authentication result by the first authentication unit.

Thus, the access permission is able to be suitably controlled in accordance with the registration state of the first device to the second device.

The first device may include an ear attachment that is configured to be attached to an ear of the user, output a sound to an ear hole of the user, and acquire an ear hole reverberation that is a reverberation in the ear hole of the output sound, and the biological information may be the ear hole reverberation.

Thus, it is possible to suitably acquire the biological information in which the individual differences of the users are reflected.

The first device may include an ear attachment that is configured to be attached to an ear of the user, output a sound to an ear hole of the user, and acquire an ear hole reverberation that is a reverberation in the ear hole of the output sound. The biological information may be the ear hole reverberation. The information acquiring-storing unit may be configured to store a first ear hole reverberation beforehand or acquire a first ear hole reverberation from an external device other than the first device, in which the first ear hole ear hole reverberation is a reverberation to at least one sound which is different in at least one of a sound pressure and a frequency from a sound output by the first device when the user is authenticated. The second authentication unit may be configured to make the information acquiring-storing unit acquire a second ear hole reverberation by making the first device output the at least one sound, and compare characteristics of the second ear hole reverberation received from the first device and characteristics of the first ear hole reverberation to at least one sound in the information acquiring-storing unit, when executing the additional authentication.

Thus, it is possible to suitably acquire the biological information in which the individual differences of the users are reflected, and further improve accuracy of authentication using the ear hole reverberation to improve accuracy of user identification.

The first device may also have a detection unit that is configured to detect whether the ear attachment is attached to the ear of the user. The first authentication unit may be configured to acquire an authentication result of the user by the second authentication unit and a detection result by the detection unit. The first authentication unit may be configured to make the user authentication result in success without acquiring the ear hole reverberation when the authentication request is made again, when it is determined that a state in which the ear attachment is attached to the ear of the user is continued based on the detection result, after the first authentication unit receives the authentication result that the user authentication by the second authentication unit results in success.

Thus, it is possible to reduce the processing load as well as reduce the burden on the user when they acquire the ear hole reverberation.

The first device may also have a detection unit that is configured to detect whether the ear attachment is attached to the ear of the user. The second authentication unit may be configured to acquire a detection result by the detection unit. The second authentication unit may be configured to maintain a state in which the user authentication results in success when the authentication request is made again, in a case where it is determined that a state in which the ear attachment is attached to the ear of the user is continued based on the detection result, after the user authentication results in success.

Thus, it is possible to reduce the processing load as well as reduce the burden on the user related to the acquisition of the biological information.

A third aspect of the disclosure is an authentication device that communicates with a biological authentication device which performs authentication based on biological information of a user and that authenticates the user with a host device. The authentication device has an information acquiring-storing unit that is configured to be able to store identification information of the biological authentication device, a determination unit that is configured to determine whether the biological authentication device is registered based on information indicating identification information received from the biological authentication device and the identification information in the information acquiring-storing unit, and an authentication unit that is configured to perform user authentication in accordance with an authentication result received from the biological authentication device, when the determination unit determines that the biological authentication device is registered, the user authentication being an authentication for the user to use the host device.

Thus, in authentication using the biological information, it is possible to improve security, since the user is authenticated using the authentication result by the biological authentication device, when the biological authentication device is registered in the authentication device.

With the disclosure, it is possible to provide an authentication system, of which security is improved, which performs user authentication in accordance with a registration state of a first device that acquires biological information to a second device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
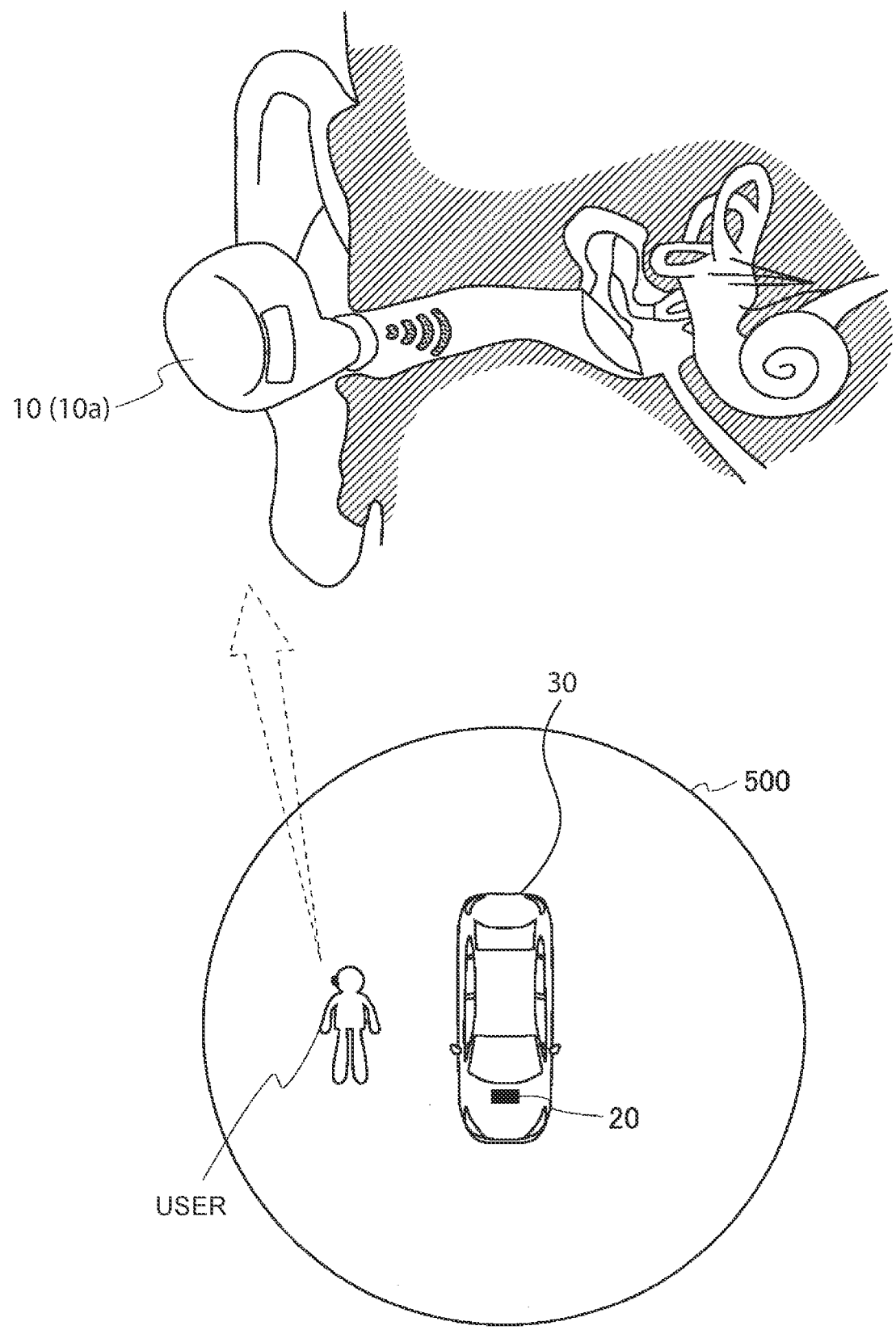
FIG. 1 illustrates a structural example of an authentication system according to first and second embodiments of the disclosure.

A first embodiment of the disclosure will be described below with reference to the drawings.
Configuration FIG. 1 illustrates a structural example of an authentication system 100 according to the embodiment. The authentication system 100 includes a first device 10 that a user puts on and a second device 20 that is installed in a vehicle 30, for example. When the first device 10 is within a prescribed area 500 from the second device 20, wireless communication is possible between the first device 10 and the second device 20.

Figure 2:
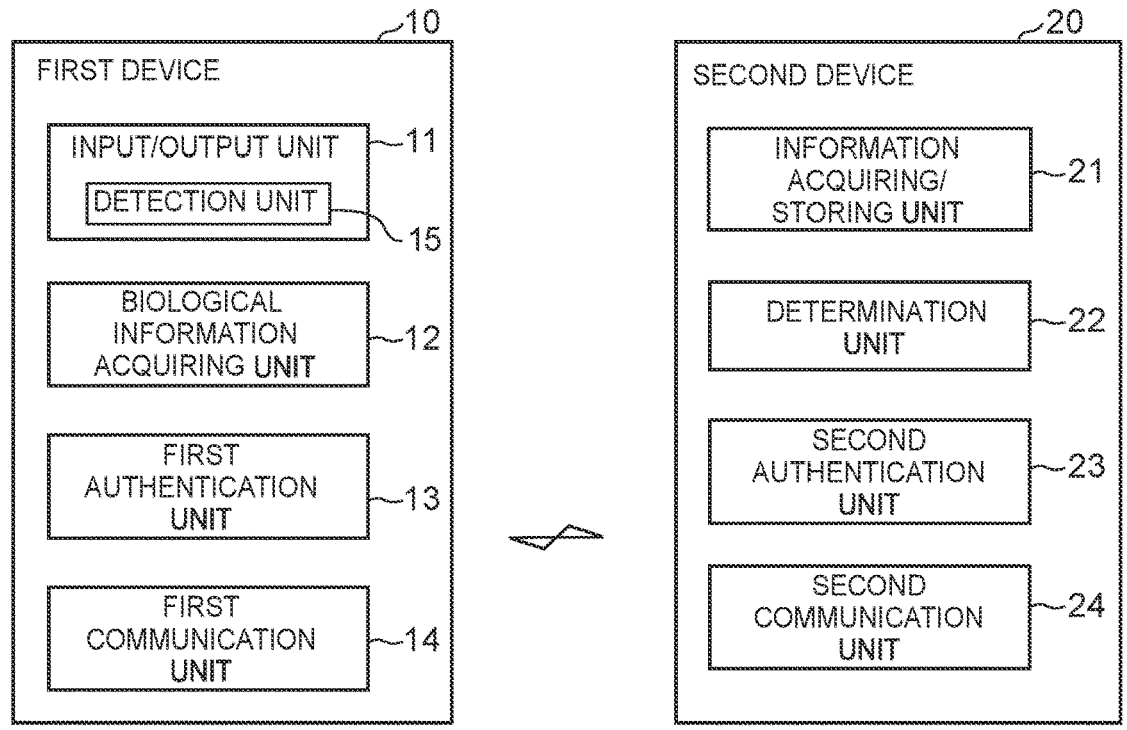
FIG. 2 illustrates function blocks of the authentication system according to the first and second embodiments of the disclosure.

FIG. 2 illustrates an example of a function block of the authentication system 100. The first device 10 includes an input/output unit 11 that outputs to the user and receives an input from the user, a biological information acquiring unit 12 that acquires biological information from the user using the input/output unit 11, a first authentication unit 13 that authenticates the user using the biological information, a first communication unit 14 that communicates with the second device 20, and a detection unit 15 that is configured to detect whether the ear attachment 10a is attached to the ear of the user.

The second device 20 includes an information acquiring-storing unit 21 that stores or acquires from an external server etc. beforehand various information, a determination unit 22 that determines whether the first device 10 is a device registered in the second device 20, a second authentication unit 23 that authenticates the user, and a second communication unit 24 that communicates with the first device 10 and other servers etc. The second device 20 may have a control unit that integrally controls operation of the units.

Figure 3:
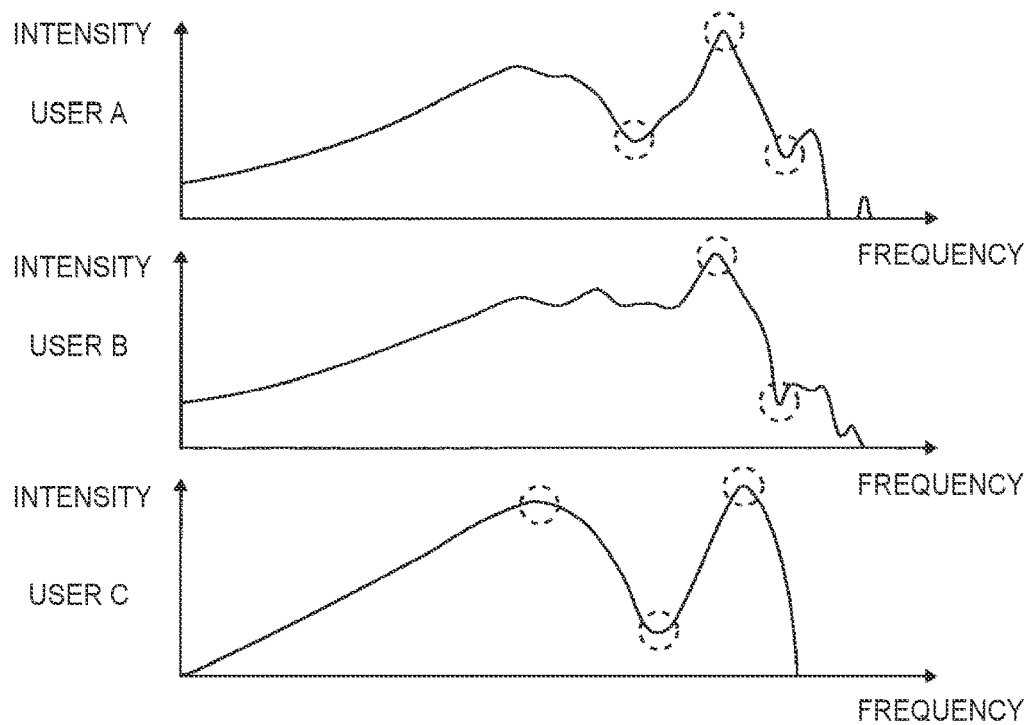
FIG. 3 illustrates an example of characteristics of biological information according to the first and second embodiments of the disclosure.

As shown in an exemplary embodiment in FIG. 1, the first device 10 is a small terminal device that includes an ear attachment 10a that is attached to the user's ear. The input/output unit 11 has a sound emission unit that is able to output sound to an ear hole of the user and a sound collection unit that collects an ear hole reverberation that is a reverberation, in the ear hole, of the sound output by the sound emission unit. Other sounds etc. can be input/output between the user and the first device 10. The biological information acquiring unit 12 acquires the ear hole reverberation that is input to the input/output unit. The first authentication unit 13 compares characteristics of the acquired ear hole reverberation and characteristics of an authenticated user's ear hole reverberation that is registered beforehand, and if the degree of similarity is a certain degree or more the user authentication results in success. Typically, the user personally owns the first device 10 and the user, who is the owner, has registered his/her own ear hole reverberation to the first device 10 beforehand. FIG. 3 illustrates an example of the characteristics of the ear hole reverberation per user. FIG. 3 is a spectrum diagram of the ear hole reverberation of three users A, B, and C with respect to a prescribed sound, in which an abscissa axis represents frequency and an ordinate axis represents intensity. In the spectrum, the location and the intensity of peaks vary, as shown in the parts circled with a dotted line, for example. The spectrum also has unique characteristics that vary in accordance with the user. Thus, it is possible to identify the user at a certain accuracy. The biological information is not limited to but also can be the ear hole reverberation, as in this example. The biological information may otherwise be information indicating the characteristics, instead of the data itself such as the ear hole reverberation. By using the ear hole reverberation as the biological information, the biological information in which the individual differences of the users are reflected can be suitably acquired by a compact device.

Figure 4:
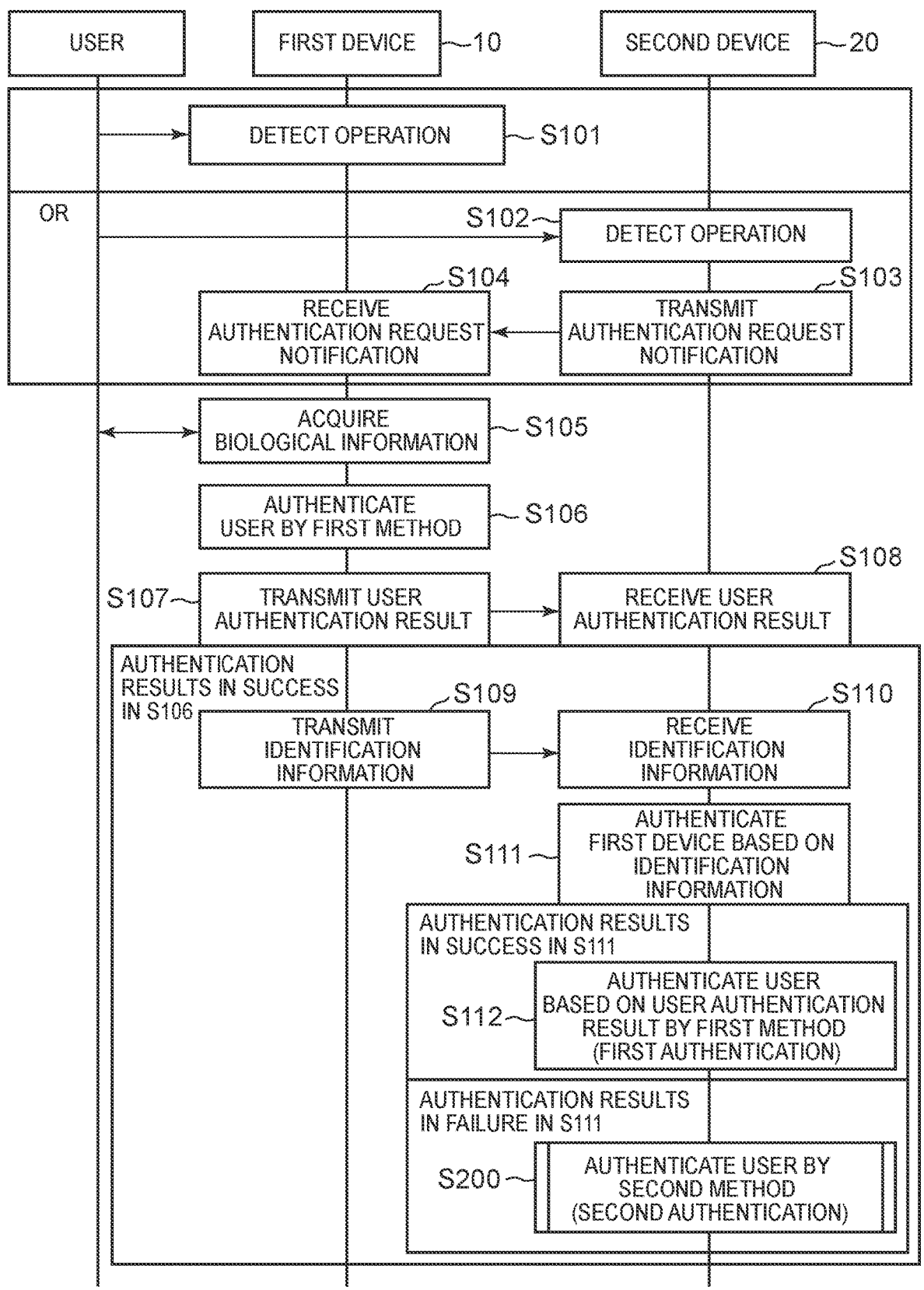
FIG. 4 is a sequence diagram that indicates a processing according to the first embodiment of the disclosure.
Figure 8:
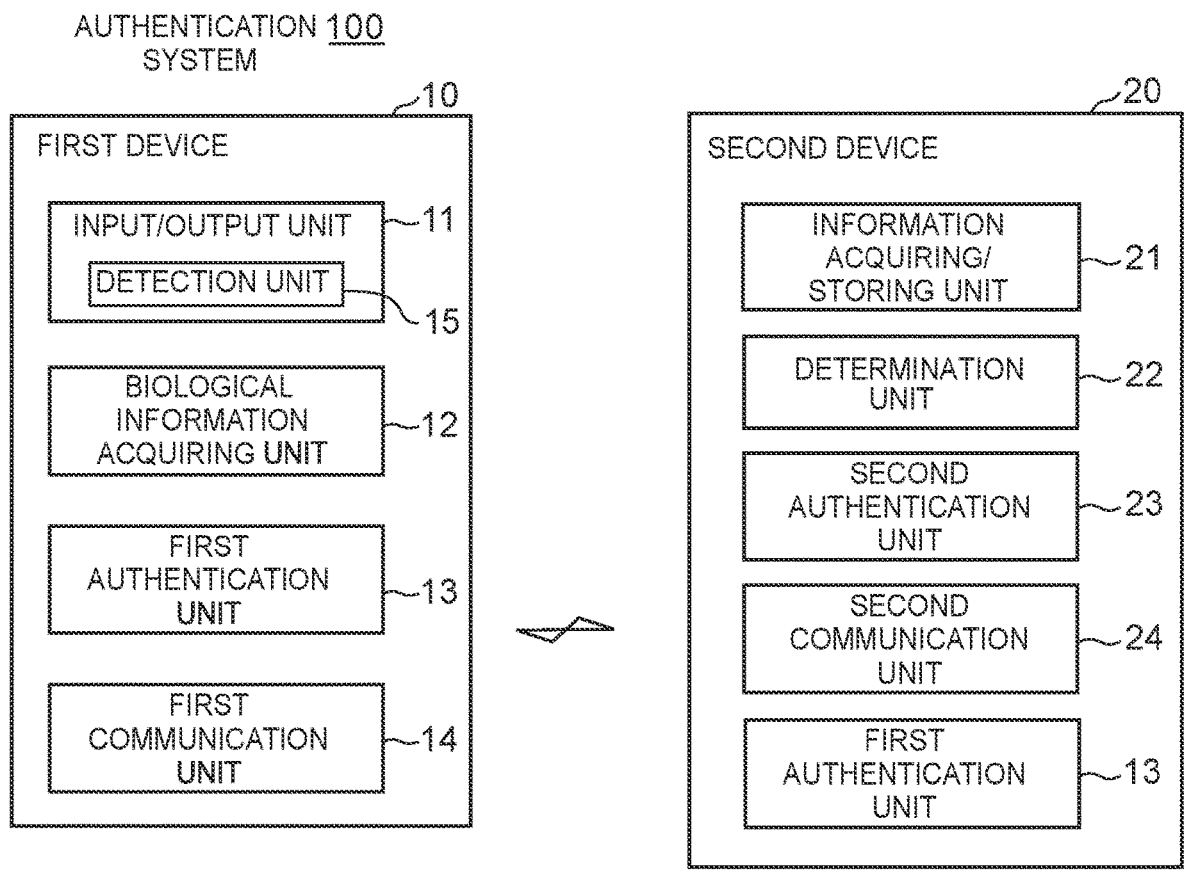
FIG. 8 illustrates function blocks of the authentication system according to another embodiment of the disclosure.

The first device 10 may have a structure in which all of the units are included in the ear attachment 10a attached to the user's ear, or as another embodiment of the disclosure, the first device 10 may have a structure in which at least the input/output unit 11 and the first communication unit 14 are included in the ear attachment 10a and the other units are included in the second device 20, for example (FIG. 8).
Processing FIG. 4 is a sequence diagram illustrating a processing of the first device 10 and the second device 20. The processing details will be described with reference to FIG. 4. When the first device 10 possessed by the user is within the area 500 described above and is able to communicate with the second device 20, an authentication request is made by a prescribed operation which initiates the processing, for example. The authentication request may be made on the first device 10 side, when the first device 10 detects that the user has carried out an operation, such as uttering a prescribed voice command of "open the door". The authentication request may be made on the second device 20 side, when the second device 20 detects that the user has carried out a prescribed operation such as touching a door handle of the vehicle 30. Steps of the processing will be described below. However, this is an example and can be changed appropriately.

Step S101: In this step, the first device 10 detects the prescribed operation and so the authentication request is made. In this case, the processing will move on to step S105.

Step S102: In this step, the second device 20 detects the prescribed operation and so the authentication request is made.

Step S103: The second communication unit 24 of the second device 20 transmits to the first device 10, an authentication request notification that is a signal to notify that the authentication request has been made.

Step S104: The first communication unit 14 of the first device 10 receives the authentication request notification from the second device 20.

Step S105: The biological information acquiring unit 12 of the first device 10 acquires the user's biological information using the input/output unit 11.

Step S106: The first authentication unit 13 of the first device 10 performs user authentication by comparing the characteristics of the biological information acquired in step S105 and the characteristics of the biological information stored beforehand (first method). Here, if there is information, of the authenticated user's biological information stored beforehand, that has characteristics in which the degree of similarity to the characteristics of the biological information acquired in step S105 is a certain degree or more, the authentication results in success. If the degree of similarity is less than a certain degree, the authentication results in failure. User authentication in this step is executed as an authentication for the user to use the first device 10. At least part of the step of the authentication processing may be executed by a device outside the first device 10. That is, the first authentication unit 13 may encrypt the biological information, transmit the encrypted biological information to an external server, and output the authentication result that the first authentication unit 13 receives from the server.

Step S107: The first communication unit 14 of the first device 10 transmits a result of user authentication that is performed in step S106.

Step S108: The second communication unit 24 of the second device 20 receives the authentication result from the first device 10. If the authentication result indicates "success", the following processing is executed. If the authentication result indicates "failure", the following processing is suspended.

Step S109: The first communication unit 14 of the first device 10 transmits to the second device 20, identification information that is information for identifying the first device 10. It is preferable that the identification information includes an identifier specific to the first device 10 and be encrypted, for example.

Step S110: The second communication unit 24 of the second device 20 receives the identification information of the first device 10.

Step S111: The determination unit 22 of the second device 20 determines whether identification information that indicates the same identifier as the identification information received from the first device 10 in step S110 is stored in the information acquiring-storing unit 21. The information acquiring-storing unit 21 acquires or stores beforehand, information indicating the authenticated identifier of the first device 10, by a prescribed procedure in which security is ensured. In the determination described above, if it is determined that the identification information that indicates the same identifier as the identification information received from the first device 10 in step S110 is stored in the information acquiring-storing unit 21, a device authentication results in success and the processing moves on to step S112. If it is determined that such identification information is not stored, the device authentication results in failure and the processing moves on to step S200.

Step S112: The second authentication unit 23 of the second device 20 trusts the user authentication result (authentication by the first method results in success) that is received in step S108 and user authentication results in success (first authentication). The user authentication in this step is executed as an authentication for the user to use the second device 20. That is, in this step, the result of the user authentication for the user to use the first device 10 executed in step S106 is used for a different purpose, which is user authentication for acquiring permission to access the vehicle 30 by using the second device 20.

As described above, in the first device 10, at least the input/output unit 11 and the first communication unit 14 may be included in the ear attachment 10a, and the other units may be included in the second device 20, as another embodiment of the disclosure. In this case, the same processing as described above is executed. However, in step S106, the biological information acquired by the first device 10 in step S105 is transmitted to the second device 20 and the first authentication unit 13 included in the second device 20 executes user authentication similarly to the procedure described above. The transmission/reception of the user authentication result in steps S107 and S108 are not executed. The transmission of the identification information in step S109 may be executed simultaneously when the first device 10 transmits the biological information to the second device 20, for example.

Step S200: In this step, the second authentication unit 23 of the second device 20 performs user authentication with a second method (second authentication) that is different from the user authentication performed with the first method in step S106. An example of the processing details according to the second method will be described below.

Example 1

Figure 5:
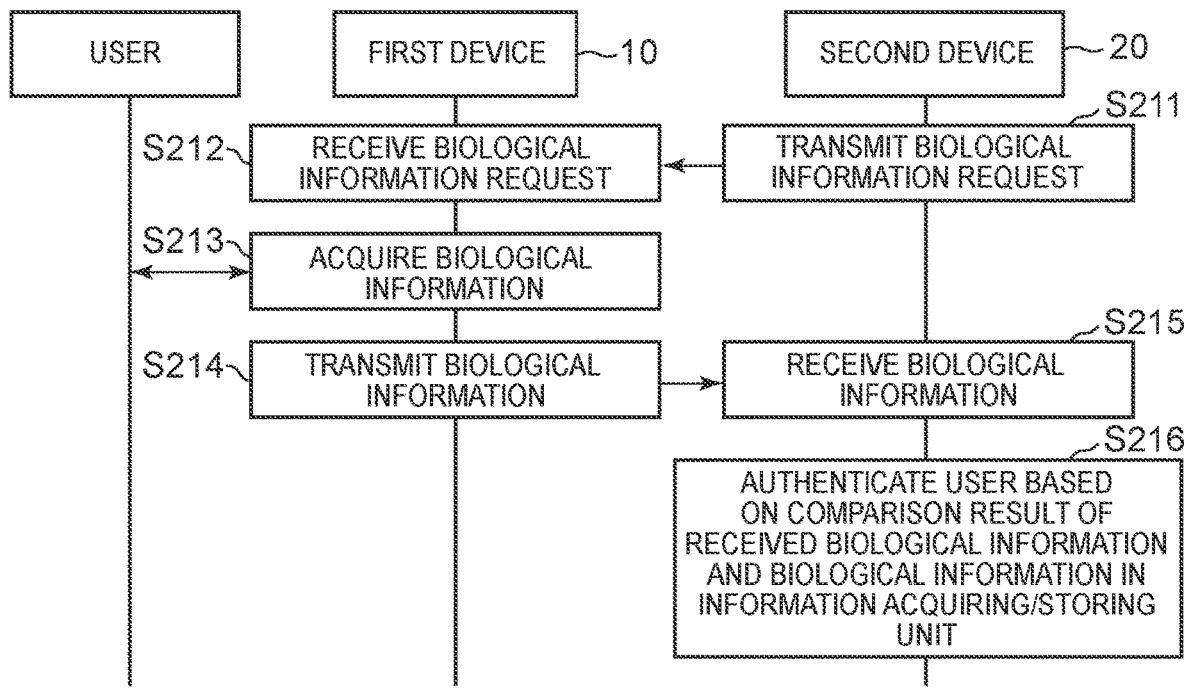
FIG. 5 is a sequence diagram that indicates the processing according to the first embodiment of the disclosure.

FIG. 5 is a sequence diagram illustrating a first example of the processing of step S200 (second method). The processing details will be described with reference to FIG. 5.

Step S211: The second communication unit 24 of the second device 20 transmits to the first device 10, a biological information request, which is a signal for requesting the user's biological information.

Step S212: The first communication unit 14 of the first device 10 receives the biological information request from the second device 20.

Step S213: The biological information acquiring unit 12 of the first device 10 acquires the user's biological information using the input/output unit 11. The acquiring conditions are made different from the conditions in step S105. For example, when the biological information is an ear hole reverberation, the sound output by the sound emission unit of the input/output unit 11 is made different from the sound in step S105 in terms of at least one characteristic such as frequency or sound pressure. The conditions can be specified by the second device 20 having information that specifies the conditions included in the biological information request in step S211, for example.

Step S214: The first communication unit 14 of the first device 10 transmits to the second device 20, the user's biological information that is acquired in step S213.

Step S215: The second communication unit 24 of the second device 20 receives the user's biological information.

Step S216: The second authentication unit 23 of the second device 20 determines whether biological information that has characteristics in which the degree of similarity to the characteristics of the biological information received in step S215 is a certain degree or more is stored in the information acquiring-storing unit 21. The information acquiring-storing unit 21 stores beforehand or appropriately acquires from an external server other than the first device 10, the biological information of the authenticated user that is acquired under the same conditions as the conditions in step S213, by a prescribed procedure in which security is ensured. In the determination described above, if it is determined that the biological information that has characteristics in which the degree of similarity to the characteristics of the biological information received in step S215 is a certain degree or more and that is acquired under the same conditions as the characteristics of the biological information received in step S215 is stored in the information acquiring-storing unit 21, user authentication results in success. If it is determined that such biological information is not stored, user authentication results in failure.

Example 2

Figure 6:
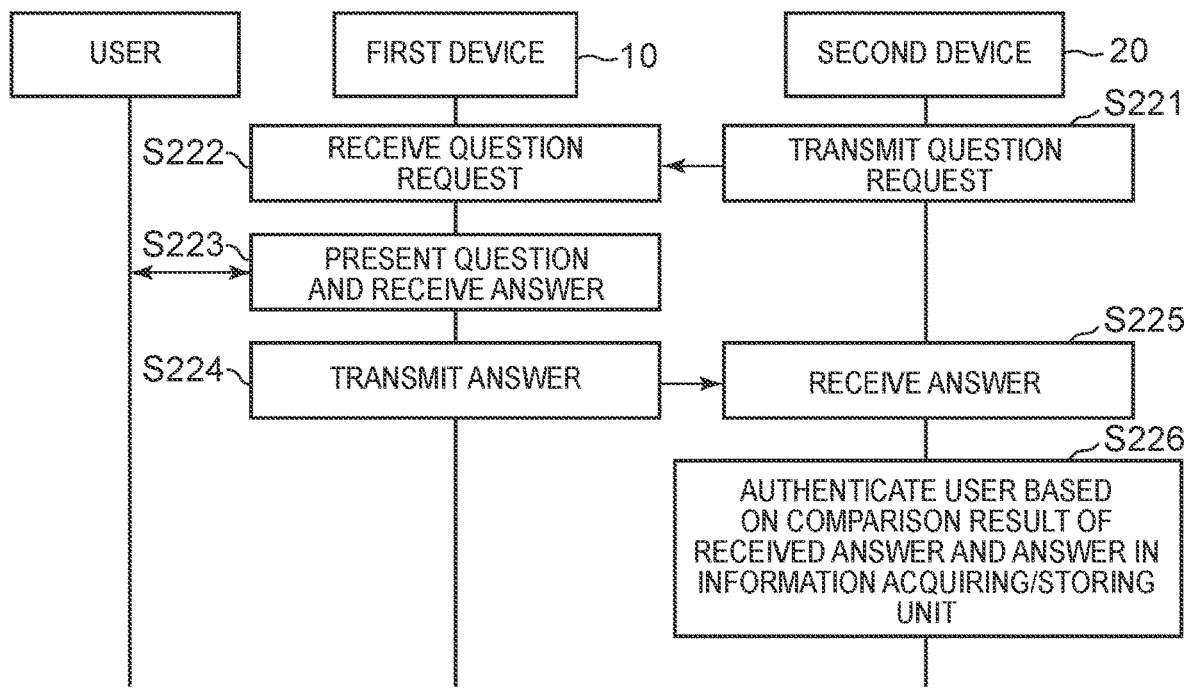
FIG. 6 is a sequence diagram that indicates the processing according to the first embodiment of the disclosure.

FIG. 6 is a sequence diagram illustrating a second example of the processing of step S200 (second method). The processing details will be described with reference to FIG. 6.

Step S221: The second communication unit 24 of the second device 20 transmits to the first device 10, a question request, which is a signal for requesting to question the user. The information acquiring-storing unit 21 stores beforehand or appropriately acquires from an external server other than the first device 10, a combination of the prescribed question and the answer to the question that is acquired from the authenticated user beforehand, by a prescribed procedure in which security is ensured. The question request includes information that specifies the question. An example is a question which asks the user's birthday.

Step S222: The first communication unit 14 of the first device 10 receives the question request from the second device 20.

Step S223: The input/output unit 11 of the first device 10 presents the question to the user and accepts the answer from the user. For example, the input/output unit 11 outputs of the question from the sound emission unit by voice. The input/output unit 11 has a microphone and collects the sound of the answer uttered by the user.

Step S224: The first communication unit 14 of the first device 10 transmits to the second device 20, the user's answer that is received in step S223.

Step S225: The second communication unit 24 of the second device 20 receives the user's answer.

Step S226: Regarding the question of which the question request was performed in step S221, the second authentication unit 23 of the second device 20 determines whether the answer received in step S225 matches with the answer stored in the information acquiring-storing unit 21. If it is determined that the answers match, user authentication results in success. If it is determined that the answers do not match, user authentication results in failure.

The example of the specific processing details of step S200 are described above. Any method in which a user wearing the first device 10 and a user registered as the authenticated user can be compared by a method other than the first method in steps S106 and S112 may be used as a second method. Additionally, a plurality of the examples described above may be combined.

If user authentication results in success in step S112 or step S200, the second authentication unit 23 of the second device 20 imparts a prescribed authority to the user, such as authority to unlock the door and to start the engine of the vehicle 30. The authority that is imparted when the user is authenticated in step S200 (second authentication) may be more limited than the authority that is imparted when the user is authenticated in step S112 (first authentication).

Effects

In the embodiment, if the first device is registered in the second device, the second device authenticates the user in accordance with the result of the authentication (authentication by first method) executed by the first authentication unit. Thus, in authentication using the biological information, it is possible to improve security by placing restrictions in accordance with the registration state of the first device to the second device, on user authentication that uses the biological information acquired by the first device.

Even if the first device is not registered in the second device, the second device is able to authenticate the user by performing an additional authentication (second authentication). Therefore, it is possible to improve convenience while ensuring security. For example, there is a case in which the second device is a device that controls the permission to access the vehicle. The owner of the vehicle registers beforehand in the second device, the first device that he/she owns. Other users that differ from the owner register in the information acquiring-storing unit of the second device or an external server, via a network, for example, their own biological information and the answer to the prescribed question which are acquired using the first device that they own. In this way, it is possible for other users to use the first device that they own to make the second device perform user authentication so that they can borrow the vehicle. Therefore, the owner can provide a vehicle rental service while avoiding the burden of lending a key of the vehicle or the first device to the other users.

By performing authentication based on the biological information acquired under a plurality of conditions as the second authentication executed by the second device, it is possible to perform biological authentication that further reflects the user's biological characteristics and to improve accuracy of user identification. The ear hole reverberation is used preferably as the characteristic pattern of the ear hole reverberation varies under conditions with different sound pressure and frequency etc. It is possible to improve accuracy of identification by using information other than the biological information, when user authentication is performed by presenting a question to the user then comparing the acquired answer and the answer in the information acquiring-storing unit. In this method, the input/output unit of the first device is attached in a position that is close to the user's body such as the user's ear. Thus, communication between the user and the input/output unit through sound etc. is incomprehensible to other people and therefore security can be easily ensured. By using the above methods independently or in combination, it is possible to ensure a high level of security even if the first device is not registered beforehand in the second device.

The permission to access can be set suitably in accordance with the registration state of the first device to the second device by limiting the authority imparted to the user when the user authentication by the second authentication results in success, compared to when the user is authenticated by the first authentication described above. The permission to access can be suitably controlled. For example, it is possible to permit the owner of the vehicle, who has registered his/her first device in the second device beforehand, to perform all operations including accessing personal information and charging, in a vehicle navigation system etc., and not just driving the vehicle. It is also possible to permit a user, who has not registered his/her first device in the second device and who is just temporarily borrowing the vehicle, to perform only basic operations of driving the vehicle.

The installation mode and the application of the authentication system are not limited. For example, the authentication system may also be used for permission/prohibition control of locking/unlocking a front door of a house, and not just for controlling the permission to access the vehicle.

Second Embodiment

The second embodiment of the disclosure will be described below with reference to the drawings.

Configuration

In the embodiment, when user authentication results in success in step S112 or step S200 in the first embodiment, if it is determined that the user wearing the first device has not changed since the biological information is acquired in step S105, the biological information request then occurs, and a part of the processing described above is omitted while the processing is executed.

In the embodiment, the first device 10 is the terminal device described above that includes the ear attachment 10a described above and that uses the ear hole reverberation as the biological information, for example. The input/output unit 11 has the detection unit 15 that can detect whether the ear attachment 10a is attached to the user's ear hole.

State Transition

Figure 7:
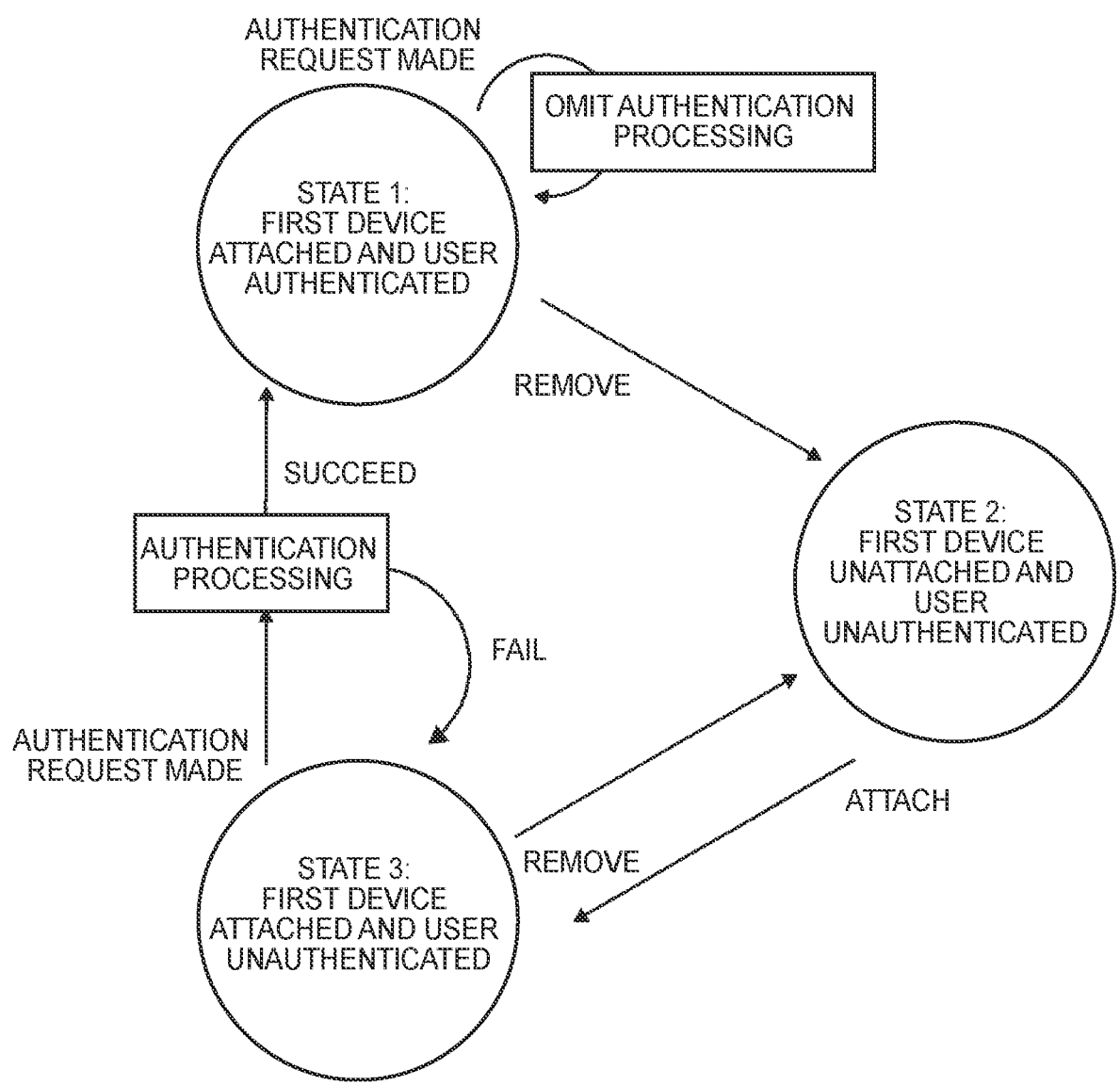
FIG. 7 is a state transition diagram of the authentication system according to the second embodiment of the disclosure.

FIG. 7 is a state transition diagram that relates to the attachment state of the first device 10 and the user authentication state in the embodiment. State 1 indicates a state in which the first device 10 is attached to the user and the user is authenticated. If the authentication request is made in this state, the processing is then executed with a part of the step in the first embodiment omitted, user authentication results in success, and state 1 is maintained. If it is detected by the detection unit 15 that the first device 10 has been removed from the attached state, the state transitions to state 2 in which the first device 10 is unattached and the user is unauthenticated.

If the same user or a different user wears the first device 10 in state 2, the state transitions to state 3 in which the first device 10 is attached and the user is unauthenticated. If the user removes the first device 10, the state transitions to state 2.

If the authentication request is made in state 3, the steps in the first embodiment are executed, and if user authentication results in success in step S112 or step S200, the state transitions to state 1. If user authentication fails in step S106 or step S200, state 3 is maintained.

The state transition described above can be carried out by managing the state by providing a flag that indicates whether the first device 10 is attached and a flag that indicates whether the user is authenticated at the time etc. while the first device 10 and the second device 20 mutually share information when appropriate. An example will be described below, in which a part of the authentication processing of the authentication processing in the first embodiment is omitted when the authentication request is made in state 1.

Example 1

In the example, the first communication unit 14 of the first device 10 receives the user authentication result from the second communication unit 24 of the second device 20. The detection unit 15 included in the input/output unit 11 of the first device 10 constantly detects whether a part such as the ear attachment 10a that acquires the biological information is attached to a biological information acquiring object portion such as the user's ear. If it is determined based on the detection result that the attached state is maintained and state 1 is continued after the previous user authentication results in success, and if the previous user authentication results in success at the first authentication or the second authentication, the first authentication unit 13 of the first device 10 then omits execution of step S105 and does not acquire the biological information even when the authentication request is made in the first device 10 (step S101). In step S106, the first authentication unit 13 allows user authentication to result in success without comparing the biological information. The following processing is executed with user authentication by the first method in step S106 considered as a success. The authentication result in step S112 or step S200 is the same as the previous authentication result (first authentication results in success or second authentication results in success).

Example 2

In this example, the second communication unit 24 of the second device 20 receives the detection result from the detection unit 15 described above, from the first communication unit 14 of the first device 10. If it is determined based on the detection result that the attached state is maintained and state 1 is continued after the previous user authentication results in success, the second authentication unit 23 of the second device 20 then omits the processing in step S103, does not transmit the authentication request notification to the first device 10, and does not execute the following processing, even when the authentication request is made in the second device 20 (step S102). Alternatively, the second authentication unit 23 maintains the same authentication result as the previous user authentication result (first authentication results in success or second authentication results in success).

Effects

In the embodiment, if user authentication has already resulted in success when the first device is attached to the same user, it is possible to maintain the authenticated state without acquiring the biological information again even if the authentication request is made. Thus, in addition to the effects of the first embodiment, it is possible to reduce the processing load as well as reduce the burden on the user related to the acquisition of the biological information. In particular, when emitting audible sound in order to acquire the ear hole reverberation as the biological information for example, it is possible to reduce the number of times the sound is emitted so that the user feels less burdened.

The embodiments of the disclosure are described above. The disclosure is not limited to an authentication system and may be applied as each device that structures the authentication system and a method or a program executed by a processor that is included in the authentication system.

The disclosure is useful for an authentication system using biological information.

What is claimed is:

1. An authentication system that executes user authentication processing in accordance with an authentication request, comprising:
   at least one first device having an ear attachment that is configured to be attached to an ear of a user, the first device being configured to:
   acquire biological information of the user;
   output an authentication result of user authentication, as an authentication for the user to use the first device, based on the biological information, the biological information being ear hole reverberation;
   output, by the ear attachment, a sound to an ear hole of the user;
   acquire, by the ear attachment, the ear hole reverberation that is a reverberation in the ear hole of the output sound; and
   detect whether the ear attachment is attached to the ear of the user, and output a detection result based on detection of the ear attachment; and
   a second device that is configured to communicate with the first device, the second device being configured to:

pre-store identification information of the first device;
determine whether the first device is registered, based on: identification information received from the first device; and the identification information that is pre-stored in the second device; and
when the second device determines that the first device is registered, perform user authentication, as an authentication for the user to use the second device, in accordance with the authentication result output by the first device, and that is received from the first device, wherein
the first device is further configured to:
acquire an authentication result of the user, as the authentication for the user to use the second device, and acquire the detection result output by the first device; and
make the user authentication result in success without acquiring the ear hole reverberation when the authentication request is made again, when it is determined that a state in which the ear attachment is attached to the ear of the user is continued based on the detection result, and after the first device receives the authentication result that the user authentication performed by the second device results in success.

2. The authentication system according to claim 1, wherein the second device is further configured to:
execute an additional authentication when the second device determines that the first device is not registered; and
authenticate the user in accordance with an authentication result of the additional authentication.

3. The authentication system according to claim 2, wherein the second device is further configured to:
pre-store the biological information of the user;
compare the biological information received from the first device and the biological information that is pre-stored in the second device; and
determine whether the authentication result output by the first device is correct, when executing the additional authentication.

4. The authentication system according to claim 2, wherein the second device is further configured to:
pre-store information indicating a combination of a question and an answer of the user to the question;
transmit the question that is pre-stored in the second device to the first device;
make the first device present the question to the user and receive an answer from the user; and
compare the answer received from the first device and the answer that is pre-stored in the second device, when executing the additional authentication.

5. The authentication system according to claim 2, wherein
the second device is further configured to set prescribed authority to the user based on an authentication result output by the second device, and
an authority that is set when the second device authenticates the user in accordance with a result of the additional authentication is more limited than an authority that is set when the second device authenticates the user in accordance with the authentication result output by the first device.

6. The authentication system according to claim 2, wherein the second device is further configured to:
pre-store a first ear hole reverberation, in which the first ear hole reverberation is a reverberation to at least one sound that is different in at least one of a sound pressure and a frequency from a sound output by the first device when the user is authenticated;
acquire a second ear hole reverberation by making the first device output the at least one sound; and
compare characteristics of the second ear hole reverberation received from the first device and characteristics of the first ear hole reverberation to the at least one sound that is pre-stored in the second device, when executing the additional authentication.

7. An authentication system that executes user authentication processing in accordance with an authentication request, comprising:
at least one first device having an ear attachment that is configured to be attached to an ear of a user, the first device being configured to:
acquire biological information of the user, the biological information being ear hole reverberation;
output, by the ear attachment, a sound to an ear hole of the user;
acquire, by the ear attachment, the ear hole reverberation that is a reverberation in the ear hole of the output sound; and
detect whether the ear attachment is attached to the ear of the user, and output a detection result based on detection of the ear attachment; and
a second device that is configured to communicate with the first device, the second device being configured to:
output an authentication result of user authentication, as an authentication for the user to use the first device, based on the biological information acquired by the first device;
pre-store identification information of the first device;
determine whether the first device is registered, based on: identification information received from the first device; and the identification information that is pre-stored in the second device;
when the second device determines that the first device is registered, perform user authentication, as an authentication for the user to use the second device, in accordance with the authentication result output by the second device;
acquire an authentication result of the user, as the authentication for the user to use the second device, and acquire the detection result output by the first device; and
make the user authentication result in success without acquiring the ear hole reverberation when the authentication request is made again, when it is determined that a state in which the ear attachment is attached to the ear of the user is continued based on the detection result, after the authentication result, as the authentication for the user to use the second device, results in success.

8. An authentication system that executes user authentication processing in accordance with an authentication request, comprising:
at least one first device having an ear attachment that is configured to be attached to an ear of a user, the first device being configured to:
acquire biological information of the user; and
output an authentication result of user authentication, as an authentication for the user to use the first device, based on the biological information; and a second device that is configured to communicate with the first device, the second device being configured to:
pre-store identification information of the first device;
determine whether the first device is registered, based on: identification information received from the first device; and the identification information that is pre-stored in the second device; and
when a determination is made that the first device is registered, perform user authentication, as an authentication for the user to use the second device, in accordance with the authentication result output by the first device, and that is received from the first device, wherein the first device is further configured to:
output, by the ear attachment, a sound to an ear hole of the user;
acquire, by the ear attachment, an ear hole reverberation that is a reverberation in the ear hole of the output sound, the biological information being the ear hole reverberation; and
detect whether the ear attachment is attached to the ear of the user, and output a detection result based on detection of the ear attachment, and the second device is further configured to:
acquire the detection result that is output by the first device; and
maintain a state in which the user authentication results in success when the authentication request is made again, in a case where it is determined that a state in which the ear attachment is attached to the ear of the user is continued based on the detection result, after the user authentication results in success.

9. An authentication device, which is a host device, that executes user authentication processing in accordance with an authentication request, and that communicates with a biological authentication device, the authentication device comprising:
a processor, wherein
the biological authentication device performs authentication based on biological information of a user, and authenticates the user with the host device, the biological information being ear hole reverberation, and the biological authentication device having an ear attachment that is configured to be attached to an ear of the user, the ear attachment is configured to: output a sound to an ear hole of the user; and acquire the ear hole reverberation that is a reverberation in the ear hole of the output sound, the biological authentication device is configured to:
detect whether the ear attachment is attached to the ear of the user; and output a detection result based on detection of the ear attachment, and the processor is configured to:
pre-store identification information of the biological authentication device in a storage;
determine whether the biological authentication device is registered, based on: information indicating identification information received from the biological authentication device; and the identification information that is pre-stored in the storage;
when a determination is made that the biological authentication device is registered, perform user authentication in accordance with an authentication result received from the biological authentication device, the user authentication being an authentication for the user to use the authentication device;
acquire an authentication result of the user, as the authentication for the user to use the host device, and acquire the detection result output by the biological authentication device; and
make the user authentication result in success without acquiring the ear hole reverberation when the authentication request is made again, when it is determined that a state in which the ear attachment is attached to the ear of the user is continued based on the detection result, after the authentication result, as the authentication for the user to use the host device, results in success.

* * * * *